United States Patent
Sommer et al.

[11] 3,867,369
[45] Feb. 18, 1975

[54] DYESTUFFS CONTAINING A (BENZENESULPHONYL)-SUBSTITUTED SULPHONAMIDE FIRST COMPONENT AND AN INDOLE FIRST COMPONENT

[75] Inventors: Richard Sommer, Leverkusen-Schlebusch; Gerhard Wolfrum, Bergisch-Neukirchen, both of Germany

[73] Assignee: Bayer Aktiengesellschaft, Leverkusen, Germany

[22] Filed: Apr. 20, 1972

[21] Appl. No.: 245,923

[30] Foreign Application Priority Data
Apr. 20, 1971  Germany............................ 2119038

[52] U.S. Cl................. 260/165, 260/196, 260/198, 260/205, 260/206, 260/207.3, 8/41 B
[51] Int. Cl.............................................. C09b 31/14
[58] Field of Search..................................... 260/165

[56] References Cited
UNITED STATES PATENTS
2,518,078  8/1950  Schmid et al...................... 260/162
3,070,592  12/1962  Baumann et al.................... 260/165

FOREIGN PATENTS OR APPLICATIONS
831,840  4/1960  Great Britain...................... 260/162
1,115,384  10/1961  Great Britain...................... 260/149

Primary Examiner—Lorraine A. Weinberger
Assistant Examiner—C. F. Warren
Attorney, Agent, or Firm—Allan R. Plumley

[57] ABSTRACT
Disazo dyestuffs which in the form of the free acid correspond to the formula

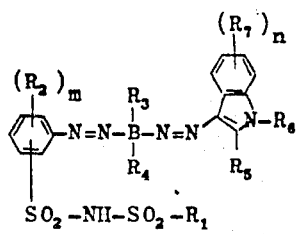

in which
$R_1$ is aryl, a $C_1$–$C_4$-aliphatic radical or dialkylamino with 1–6 carbon atoms in the alkyl radical;
$R_2$ is chlorine, bromine, alkoxy, or alkyl;
$R_3$ and $R_4$ are hydrogen, chlorine, bromine, alkoxy, or alkyl;
$R_5$ is alkyl or aryl;
$R_6$ is hydrogen, alkyl, or alkyl substituted by cyano, carbonamide or carboxyl;
$R_7$ is a substituent, such as alkyl, alkoxy, halogen, nitro, sulfo, or cyano;
B is a 1,4-phenylene or 1,4-napthylene radical;
$m$ is a number 0–2; and
$n$ is a number 0–2;

and their use for the dyeing and printing of natural and synthetic fiber materials containing amide groups, for example those of wool, silk and polyamide, such as poly-ε-caprolactum or the reaction product of hexamethylene-diamine with adipic acid, are disclosed. The dyeings obtained, especially those on polyamide materials, are distinguished by good fastness properties, especially by good fastness to wet porcessing and good fastness to light.

11 Claims, No Drawings

DYESTUFFS CONTAINING A (BENZENESULPHONYL)-SUBSTITUTED SULPHONAMIDE FIRST COMPONENT AND AN INDOLE FIRST COMPONENT

The subject of the present invention are new, valuable disazo dyestuffs which in the form of the free acid correspond to the general formula

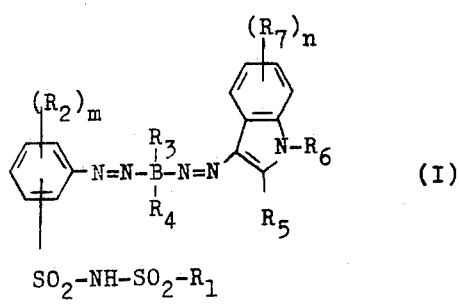

as well as their manufacture and use for dyeing synthetic fibre materials, especially those from polyamides.

In the general Formula (I)

$R_1$ represents an aromatic radical or an aliphatic radical with 1 – 4 C atoms or a dialkylamino group with 1 – 6 C atoms in the alkyl radical, $R_2$ represents chlorine, bromine, an alkoxy group or an alkyl group, $R_3$ and $R_4$ represent hydrogen, chlorine, bromine, an alkoxy group or an alkyl group, $R_5$ represents an alkyl group which is not substituted further or an aryl group, $R_6$ represents hydrogen or an alkyl group which is optionally substituted by a nitrile, carbonamide or carboxyl group, $R_7$ represents a substituent, especially alkyl, alkoxy, halogen, nitro, sulpho or nitrile, B represents a 1,4-phenylene or 1,4-naphthylene radical, $m$ represents the numbers 0 – 2 and $n$ represents the numbers 0 – 2.

The radicals $R_2$ and $R_7$ may each have the same or different meaning if $n$ and/or $m$ are different and $n$ and $m$ represent the number 2.

Suitable radicals B are, for example, radicals of the formulae

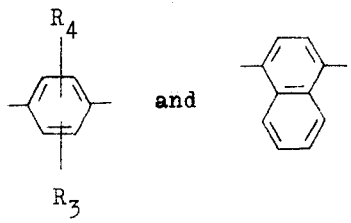

wherein $R_3$ and $R_4$ have the above-mentioned meaning.

Preferred alkyl groups are those with 1 – 4 C atoms. The alkyl and alkoxy groups can, unless otherwise stated, be substituted further, for example by nitrile, hydroxyl or optionally substituted phenyl. Suitable alkyl groups are, for example, $-CH_3$, $-C_2H_5$, $-C_3H_7$, $-C_4H_9$ and $-C_2H_4CN$.

Preferred alkoxy groups are those with 1 – 6 C atoms. Suitable alkoxy groups are, for example, $-OCH_3$, $-OC_2H_5$, $-OC_3H_7$, $-OC_4H_9$, $-OCH_2CH_2OH$ and $-OCH_2C_6H_5$.

Possible halogens are, in particular, Cl and Br. Suitable aromatic radicals $R_1$ and aryl groups $R_5$ are in particular phenyl radicals. The phenyl radicals can possess further substituents, for example $C_1 - C_4$-alkyl groups, $C_1 - C_4$-alkoxy groups, halogen, nitrile, nitro and the like. Preferred phenyl radicals are phenyl and methylphenyl.

Suitable aliphatic radicals $R_1$ are, in particular, the abovementioned $C_1 - C_4$-alkyl groups.

Suitable dialkylamino groups are, in particular, the dimethylamino or diethylamino group.

Preferred dyestuffs are those of the formula

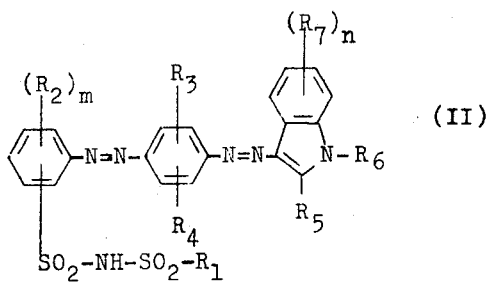

wherein $R_1$, $R_2$, $R_3$, $R_4$, $R_5$, $R_6$, $R_7$, $m$ and $n$ have the above-mentioned meaning, and those of the formula

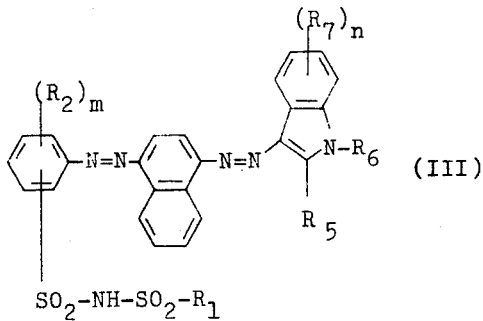

wherein $R_1$, $R_2$, $R_5$, $R_6$, $R_7$, $m$ and $n$ have the above-mentioned meaning.

Particularly valuable dyestuffs are those of the formula

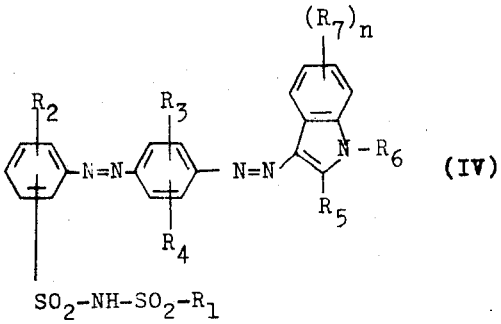

wherein

R$_1$, R$_2$, R$_3$, R$_4$, R$_5$, R$_6$, R$_7$ and $n$ have the above-mentioned meaning, especially those of the formula

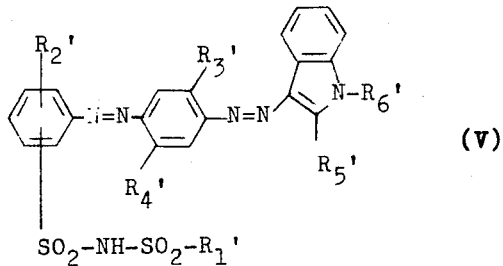

(V)

wherein

R$_1$' represents an aromatic radical or an aliphatic radical with 1-4 C atoms,

R$_2$' represents hydrogen, chlorine, bromine, an alkyl group with 1-4 C atoms or an alkoxy group with 1-4 C atoms, R$_3$' represents hydrogen, chlorine or a methyl, ethyl, methoxy or ethoxy group, R$_4$' represents hydrogen or a methoxy, ethoxy, methyl or ethyl group, R$_5$' represents alkyl with 1-4 C atoms or phenyl, R$_6$' represents hydrogen or an alkyl group with 1-4 C atoms which is optionally substituted by a nitrile, carbonamide or carboxyl group.

The dyestuffs of the formula (I) are manufactured by diazotising amines of the formula

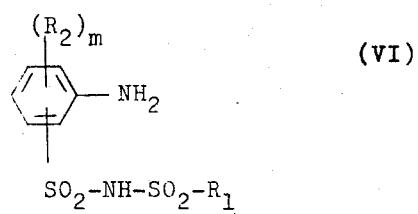

(VI)

wherein

R$_1$, R$_2$ and $m$ have the above-mentioned meaning, and reacting the product with amines of the formula

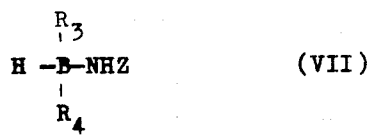

(VII)

wherein

R$_3$, R$_4$ and B have the above-mentioned meaning and Z represents H, —SO$_3$H or —CH$_2$SO$_3$H, to give monoazo dyestuffs of the formula

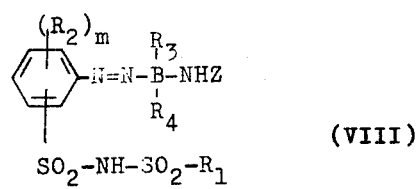

(VIII)

diazotising the monoazo dyestuffs thus obtained, after splitting off the group Z, if necessary, by alkaline or acid saponification, and coupling the product with indoles of the formula

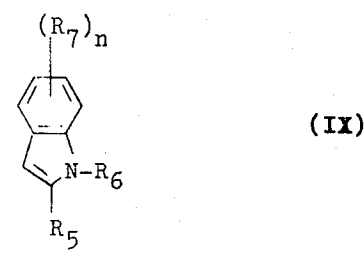

(IX)

wherein

R$_5$, R$_6$, R$_7$ and $n$ have the above-mentioned meaning.

As examples of suitable disulphimides of the Formula (VI) there may be mentioned: (3-amino-benzenesulphonyl)-benzenesulphonamide, (3-amino-4-chlorobenzenesulphonyl)-benzenesulphonamide, (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chlorobenzenesulphonyl)-p-toluenesulphonamide, (3-amino-4-chlorobenzenesulphonyl)-methanesulphonamide, (3-amino-4-chlorobenzenesulphonyl)-butanesulphonamide, (3-amino-4-chlorobenzenesulphonyl)-o-toluenesulphonamide, (3-amino-6-methylbenzenesulphonyl)-benzenesulphonamide, (3-amino-6-methylbenzenesulphonyl)-butanesulphonamide, (3-amino-6-methylbenzenesulphonyl)-methanesulphonamide, (3-amino-6-methylbenzenesulphonyl)-p-toluenesulphonamide, (3-amino-6-methylbenzenesulphonyl)-o-toluenesulphonamide, (3-amino-4-methylbenzenesulphonyl)-benzenesulphonamide, (3-amino-4-methylbenzenesulphonyl)-p-toluenesulphonamide, (3-amino-4-methylbenzenesulphonyl)-o-toluenesulphonamide, (3-amino-4-methylbenzenesulphonyl)-methanesulphonamide, (3-amino-4-methoxybenzenesulphonyl)-benzenesulphonamide, (3-amino-4-methoxybenzenesulphonyl)-p-toluenesulphonamide, (3-amino-4-methoxybenzenesulphonyl)-methanesulphonamide, (3-amino-4-methoxybenzenesulphonyl)-butanesulphonamide, (3-amino-6-methoxybenzenesulphonyl)-benzenesulphonamide, (3-amino-6-methoxybenzenesulphonyl)-p-toluenesulphonamide, (3-amino-6-methoxybenzenesulphonyl)-methanesulphonamide, (3-amino-6-methoxybenzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-ethylbenzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methylbenzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide, (4-amino-5-methyl-benzenesulphonyl)-benzenesulphonamide and (3-amino-benzenesulphonyl)-dimethylaminosulphonamide.

Suitable middle components of the formula (VII) are, for example: aniline, 2-aminotoluene, 3-aminotoluene, 2-amino-ethylbenzene, 3-amino-ethylbenzene, 3-chloroaniline, 3-bromoaniline, 2-aminoanisole, 3-aminoanisole, 2-amino-ethoxybenzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene, 2-amino-1,4-dimethoxy-benzene, 2-amino-4-ethoxy-toluene, 2-amino-1,4-diethoxy-benzene, α-naphthylamine or their N-sulphonic acid or their N-ω-methanesulphonic acids.

Suitable coupling components (IX) are, for example: 2-methylindole, 2-phenylindole, 1-methyl-2-phenylindole, 1,2-dimethylindole, 1-β-cyanoethyl-2-methylindole, 1-β-cyanoethyl-2-phenylindole, β-(2-phenylindolyl-1)-propionic acid amide, β-(2-methylindolyl-1)-propionic acid, β-(2-methylindolyl-1)-propionic acid, 2-β-naphthylindole, 2-p-biphenylylindole, 2,5-dimethylindole, 2,4-dimethyl-7-methoxyindole, 2-phenyl-5-ethoxyindole, 2-methyl-5-ethoxyindole, 2-methyl-5-chloroindole, 2-methyl-6-chloroindole, 2-methyl-5-nitroindole, 2-methyl-5-cyanoindole, 2-methyl-7-chloroindole, 2-methyl-5-fluoroindole, 2-methyl-5-bromoindole, 2-methyl-5,7-dichloroindole, 1-β-cyanoethyl-2,6-dimethylindole, and 2-phenylindole-5-sulphonic acid and 1-methyl-2-phenylindole-5-sulphonic acid.

The indole-sulphonic acids are manufactured by sulphonation of 2-alkyl-indoles or 2-aryl-indoles in accordance with the process described in German Pat. specification No. 137,117, wherein the sulphonic acid group probably enters the 5-position.

The diazotisation of the amines of the formula (VI) is carried out in accordance with methods which are in themselves known, preferably in aqueous solution containing mineral acid, using sodium nitrite. The coupling of the diazonium compounds of the amines of the formula (VI) with the coupling components of the formula (VII) can be carried out in accordance with processes which are in themselves known, for example in a neutral to strongly acid, but preferably in a weakly acid, pH range, in an aqueous or aqueous-organic medium.

The monoazo dyestuffs of the formula (VIII) are isolated in accordance with known methods, for example by filtration or by salting-out by means of a salt which is soluble in aqueous solution, for example by means of NaCl or KCl, and subsequent filtration. If coupling components of the formula (VII) with Z = $SO_3H$ or —$CH_2$—$SO_3H$ are employed, isolation of the monoazo dyestuffs is frequently only required after the liberation of the amino group of the coupling component, effected by alkaline or acid saponification. An intermediate isolation of the monoazo dyestuffs, however, is not always necessary — they can also be diazotised further without being isolated.

The further diazotisation of the aminoazo dyestuffs (VIII) with Z = H can, for example, be carried out in an acid, aqueous dispersion by means of sodium nitrite solution, and the diazotisation temperatures can be between 0° and 30°C. Aminoazo dyestuffs of the formula (VIII) with Z = H can furthermore also be diazotised indirectly by dissolving them under alkaline conditions, adding sodium nitrite solution and pouring the mixture into aqueous hydrochloric acid, or adding hydrochloric acid.

The coupling of the diazotised aminoazo dyestuffs (VIII) with the end components (IX) to give the disazo dyestuffs (I) is also carried out in a manner which is in itself known, for example in a neutral, weakly acid or strongly acid aqueous medium, or in an aqueous-organic medium. The disazo dyestuffs of the formula (I) are generally rather sparingly soluble in an acid medium and can be isolated by simply filtering them off, if necessary after addition of sodium chloride. If the dyestuffs are obtained in an impure form, they can be recrystallised in a known manner from hot water, if necessary with addition of alkali. The more sparingly soluble dyestuffs (I) which are isolated under acid conditions can be rendered easily soluble in water by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated, or be present, or be employed further, in the form of the free acid or of alkali metal salts or ammonium salts. Suitable alkali metal salts, in which the hydrogen atom of the —NH—group is thus replaced by an alkali metal cation, are the sodium, potassium, caesium and rubidium salts.

The new dyestuffs are particularly suitable for dyeing and printing natural and synthetic fibre materials containing amide groups, for example those of wool, silk and polyamide, such as poly-ε-caprolactam or the reaction product of hexamethylenediamine with adipic acid. The dyeings obtained, especially those on polyamide materials are distinguished by good fastness properties, especially by good fastness to wet processing and good fastness to light. The neutral absorption and the combination behaviour with other suitable dyestuffs for this material are also good. The dyestuffs of the formula (1) are employed either in the form of the free acid ($>$NH)

or as the alkali or ammonium salt.

In the examples which follow, parts denote parts by weight and percentages denote percentages by weight.

EXAMPLE 1

34.6 parts of (3-amino-4-chloro-benzenesulphonyl)-benzenesulphonamide are dissolved in 200 parts of water with the addition of 10 percent strength sodium hydroxide solution, and treated with 7.7 parts of sodium nitrite. The solution thus obtained is run into 200 parts of ice/H$_2$O and 35 parts of concentrated hydrochloric acid and is diazotised in 0.5 hour at 0°–5°C; the excess nitrous acid is thereafter removed by means of amidosulphonic acid and the diazonium salt suspension is run into a solution of 21 parts of anilino-methanesulphonic acid and 9 parts of sodium bicarbonate in 100 parts of water, at 0°–5°C, and the pH is kept at between 6 and 8.5 by further addition of sodium bicarbonate. After completion of coupling, the product is salted-out with sodium chloride, filtered off and washed with saturated sodium chloride solution. The moist dyestuff paste is stirred for 1 hour in 200 parts of 7 percent strength sodium hydroxide solution at 80°–90°. After the splitting off of the sulphomethyl group is complete, the dyestuff is precipitated by adding sodium chloride, filtered off, washed with saturated sodium chloride solution and dried in vacuo at 50°. 45 parts of the monoaminoazo dyestuff thus obtained are dissolved in 500 parts of water, 7.5 parts of sodium nitrite are added, the dyestuff is diazotised by pouring into 1,000 parts of water and 30 parts of concentrated hydrochloric acid at 10°–20° over the course of 30 minutes, and thereafter the excess nitrous acid is destroyed with amidosulphonic acid. The diazonium salt suspension thus obtained is run at 10°–20° into a solution of 20.7 parts of 1-methyl-2-phenyl-indole in glacial acetic acid. The mixture is slightly buffered with sodium acetate. After completion of coupling, the disazo dyestuff is isolated by filtration. The dyestuff corresponds to the formula

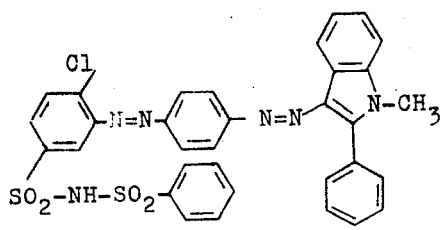

It dyes polyamide, from a weakly acid or neutral bath, in a yellowish-tinged scarlet. The dyeings show good fastness properties.

DYEING EXAMPLE 0.1 g of the dyestuff is dissolved in 100 ml of hot water, 5 ml of 10% strength ammonium acetate solution are added and the mixture is diluted to a volume of 500 ml with water. 10 g of polyamide fibres are introduced into the dyebath, the dyebath is brought to the boil over the course of 20 minutes, 4 ml of 10 percent strength acetic acid are added and the whole is kept at the boil for 1 hour. The fibres are then rinsed and dried at 70°–80°C.

EXAMPLE 2

85 parts of (3-amino-4-chloro-benzenesulphonyl)-methanesulphonamide are dissolved in 700 parts of water with the addition of 10 percent strength sodium hydroxide solution, 22 parts of sodium nitrite are added and the mixture is diazotised by pouring into 300 parts of ice/water and 95 parts of concentrated hydrochloric acid at 0°–5°. After completion of the diazotisation, an excess of nitrous acid is destroyed with amidosulphonic acid. The diazonium salt suspension is run, at 0°–5°, into a solution of 44 parts of 3-amino-4-methoxy-toluene in 30 parts of concentrated hydrochloric acid and 400 parts of water. The mixture is slowly buffered by adding sodium acetate solution. After completion of coupling, the product is filtered off, washed with saturated sodium chloride solution and dried. 43 parts of the monoazonoazo dyestuff thus obtained and dissolved in 500 parts of water, mixed with 7.5 parts of sodium nitrite and diazotised by pouring into 200 parts of water/ice and 30 parts of concentrated hydrochloric acid at 10°–15°C over the course of 30 minutes. Thereafter, the excess nitrous acid is removed by means of amidosulphonic acid. The diazonium compound thus obtained is allowed to run into a solution of 20.7 parts of 1-methyl-2-phenyl-indole in glacial acetic acid and the mixture is thereafter slightly buffered with sodium acetate. After completion of coupling, the disazo dyestuff is isolated by filtration. The dyestuff corresponds to the formula

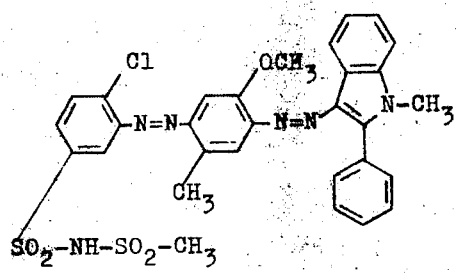

It dyes polyamide, from a weakly acid or neutral bath, in bluish-tinged red shades of good fastness properties.

EXAMPLE 3

314 parts of (3-amino-benzenesulphonyl)-benzenesulphonamide are dissolved in 2,000 parts of water with the addition of 70 parts of 40 percent strength sodium hydroxide solution, and 69 parts of sodium nitrite are then added. The solution thus obtained is introduced dropwise, at 0°–3°C, into a mixture of 1,000 parts of ice and 400 parts of 37 percent strength hydrochloric acid. After completion of the dropwise addition, the mixture is stirred for a further 30 minutes, an excess of nitrous acid is removed with amidosulphonic acid, and the mixture is then introduced, at 0°–5°C, into a solution of 140 parts of 3-amino-4-methoxy-toluene in 2,000 parts of water and 100 parts of 37 percent strength hydrochloric acid. The mixture is then neutralised to pH 4–5 with approx. 300 parts of 40 percent strength sodium hydroxide solution. The coupling is complete after approx. 3 hours. The aminoazo dyestuff is filtered off and twice washed with approx. 3 percent strength hydrochloric acid. It is dissolved in 3,000 parts of water, with the addition of concentrated sodium hydroxide solution at pH 8, 69 parts of sodium nitrite are added and the solution thus obtained is run into a mixture of 1,000 parts of ice and 300 parts of 37 percent strength hydrochloric acid. Hereupon, the sparingly soluble diazo compound precipitates. After removing an excess of nitrite with amidosulphonic acid, the suspension of the diazo compound is introduced into a solution of 193 parts of 2-phenyl-indole in glacial acetic acid. After completion of coupling, the disazo dyestuff is filtered off, washed with a little water and dried. The dyestuff corresponds to the formula

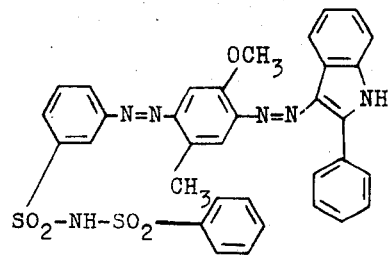

It dyes polyamide in bluish-tinged red shades of good fastness properties.

If the procedure indicated in the preceding examples is followed and the starting components, middle components and end components indicated in the table below are used, further disazo dyestuffs of the general formula (I) are obtained.

| Example | Starting Component | Middle Component | End Component |
|---|---|---|---|
| 4 | (3-Amino-benzenesulphonyl)-benzenesulphonamide | Aniline | 2-Phenyl-indole |
| 5 | do. | do. | 1-Methyl-2-phenyl-indole |
| 6 | do. | do. | 1-β-Cyanoethyl-2-phenyl-indole |
| 7 | do. | do. | 2-Methyl-indole |
| 8 | do. | do. | 2-Phenyl-indole-5-sulphonic acid |
| 9 | do. | do. | 2,6-Dimethyl-indole |
| 10 | do. | do. | 2-Methyl-5-chloro-indole |
| 11 | do. | do. | β-(2-Phenylindolyl-1)-propionic acid amide |
| 12 | do. | 3-Amino-toluene | 2-Methyl-indole |
| 13 | do. | do. | 2-Phenyl-indole |
| 14 | do. | do. | 1-Methyl-2-phenyl-indole |
| 15 | do. | do. | 1-β-Cyanoethyl-2-phenyl-indole |
| 16 | do. | do. | 2-Methyl-5-chloro-indole |
| 17 | do. | do. | 2-Methyl-7-chloro-indole |
| 18 | do. | do. | 1-β-Cyanoethyl-2-methyl-indole |
| 19 | do. | 3-Amino-4-methoxy-toluene | 1-β-Cyanoethyl-2-phenyl-indole |
| 20 | do. | do. | 2,5-Dimethyl-indole |
| 21 | do. | do. | 2-Phenyl-indole-5-sulphonic acid |
| 22 | do. | do. | 1-Methyl-2-phenyl-6-bromo-indole |
| 23 | do. | do. | 2-Methyl-7-chloro-indole |
| 24 | do. | do. | 1-β-Cyanoethyl-2,6-dimethyl-indole |
| 25 | do. | do. | β-(2-Phenylindolyl-1)-propionic acid amide |
| 26 | do. | do. | 1-Methyl-2-phenyl-indole |
| 27 | do. | do. | 2-Methyl-indole |
| 28 | do. | 3-Amino-anisole | 2-Phenyl-indole |
| 29 | do. | do. | 2-Methyl-indole |
| 30 | do. | do. | 1-Methyl-2-phenyl-indole |
| 31 | do. | do. | 1-β-Cyanoethyl-2-phenyl-indole |
| 32 | do. | do. | 1-β-Cyanoethyl-2-methyl-indole |
| 33 | do. | do. | 2-Phenyl-indole-5-sulphonic acid |
| 34 | do. | do. | 2,5-Dimethyl-indole |
| 35 | do. | do. | 2-Methyl-5-chloro-indole |
| 36 | do. | 2-Amino-toluene | 2-Phenyl-indole |
| 37 | do. | do. | 2-Methyl-indole |
| 38 | do. | do. | 1-Methyl-2-phenyl-indole |
| 39 | do. | do. | 1-β-Cyanoethyl-2-phenyl-indole |
| 40 | do. | do. | 2-Methyl-7-chloro-indole |
| 41 | do. | do. | 2,5-Dimethyl-indole |
| 42 | do. | 3-Amino-ethyl-benzene | 2-Phenyl-indole |
| 43 | do. | do. | 2-Methyl-indole |
| 44 | do. | do. | 1-Methyl-2-phenyl-indole |
| 45 | do. | do. | 1-β-Cyanoethyl-2-phenyl-indole |
| 46 | do. | do. | 2-Phenyl-indole-5-sulphonic acid |
| 47 | do. | 2-Amino-ethyl-benzene | 2-Phenyl-indole |
| 48 | do. | do. | 2-Methyl-indole |
| 49 | do. | do. | 1-Methyl-2-phenyl-indole |
| 50 | do. | do. | 2-Methyl-5-chloro-indole |
| 51 | do. | do. | 2,5-Dimethyl-indole |
| 52 | do. | do. | 2-Methyl-7-chloro-indole |
| 53 | do. | do. | 2-Phenyl-indole-5-sulphonic acid |
| 54 | do. | do. | β-(2-Phenyl-indolyl-1)-propionic acid amide |
| 55 | do. | 2-Amino-anisole | 1-β-Cyanoethyl-2-phenyl-indole |
| 56 | do. | do. | 2-Phenyl-indole |
| 57 | do. | do. | 2-Methyl-indole |
| 58 | do. | do. | 2,5-Dimethyl-indole |
| 59 | do. | 3-Chloro-aniline | 2-Phenyl-indole |
| 60 | do. | do. | 2-Methyl-indole |
| 61 | do. | do. | 1-Methyl-2-phenyl-indole |
| 62 | do. | do. | 1-β-Cyanoethyl-2-phenyl-indole |

3,867,369

—Continued

| Example | Starting Component | Middle Component | End Component |
|---|---|---|---|
| 63 | do. | 3-Bromo-aniline | 1-Methyl-2-phenyl-indole |
| 64 | do. | do. | 2-Phenyl-indole |
| 65 | do. | do. | 2-Methyl-indole |
| 66 | do. | 3-Amino-ethoxy-benzene | 2-Phenyl-indole |
| 67 | do. | do. | 1-Methyl-2-phenyl-indole |
| 68 | do. | do. | 1-β-Cyanoethyl-2-phenyl-indole |
| 69 | do. | do. | 2-Phenyl-indole-5-sulphonic acid |
| 70 | do. | do. | 2-Methyl-7-chloro-indole |
| 71 | do. | do. | 2-Phenyl-5-nitro-indole |
| 72 | do. | 1-Amino-2,3-dimethyl-benzene | 2-Phenyl-indole |
| 73 | do. | do. | 2-Methyl-indole |
| 74 | do. | do. | 1-Methyl-2-phenyl-indole |
| 75 | do. | 1-Amino-2,5-dimethyl-benzene | 2-Phenyl-indole |
| 76 | do. | do. | 1-Methyl-2-phenyl-indole |
| 77 | do. | do. | 1-β-Cyanoethyl-2-phenyl-indole |
| 78 | do. | do. | 2,5-Dimethyl-indole |
| 79 | do. | 2-Amino-4-methoxy-toluene | 2-Phenyl-indole |
| 80 | do. | do. | 1-Methyl-2-phenyl-indole |
| 81 | do. | do. | 2-Methyl-indole |
| 82 | do. | do. | 1-β-Cyanoethyl-2-phenyl-indole |
| 83 | do. | do. | β-(2-Phenylindolyl-1)-propionic acid amide |
| 84 | do. | 2-Amino-1,4-dimethoxy-benzene | 2-Methyl-indole |
| 85 | do. | do. | 2-Phenyl-indole |
| 86 | do. | do. | 1-Methyl-2-phenyl-indole |
| 87 | do. | do. | 2-Phenyl-indole-5-sulphonic acid |
| 88 | do. | do. | 2,5-Dimethyl-indole |
| 89 | do. | do. | 2-Methyl-7-chloro-indole |
| 90 | do. | α-Naphthylamine | 2-Phenyl-indole |
| 91 | do. | do. | 1-Methyl-2-phenyl-indole |
| 92 | do. | do. | 2-Methyl-indole |
| 93 | do. | do. | 1-β-Cyanoethyl-2-phenyl-indole |
| 94 | do. | do. | β-(2-Phenyl-indolyl-1)-propionic acid amide |
| 95 | do. | do. | 2-Phenyl-indole-5-sulphonic acid |
| 96 | do. | 2-Amino-1,4-diethoxy-benzene | 1-β-Cyanoethyl-2-phenyl-indole |
| 97 | do. | do. | 2-Phenyl-indole |
| 98 | do. | do. | 2-Methyl-indole |
| 99 | do. | do. | 1-Methyl-2-phenyl-indole |
| 100 | do. | do. | 2-Methyl-5-chloro-indole |
| 101 | do. | 2-Amino-4-ethoxy-toluene | 2-Phenyl-indole |
| 102 | do. | do. | 2-Methyl-indole |
| 103 | do. | do. | 1-Methyl-2-phenyl-indole |
| 104 | (4-Amino-benzenesulphonyl)-benzenesulphonamide | Aniline | 2-Phenyl-indole |
| 105 | do. | do. | 1-Methyl-2-phenyl-indole |
| 106 | do. | do. | 2-Methyl-indole |
| 107 | do. | do. | 1-β-Cyanoethyl-2-phenyl-indole |
| 108 | do. | 3-Amino-toluene | 2-Phenyl-indole-5-sulphonic acid |
| 109 | do. | do. | 2-Phenyl-indole |
| 110 | do. | do. | 1-Methyl-2-phenyl-indole |
| 111 | do. | do. | 2-Methyl-indole |
| 112 | do. | do. | 1-β-Cyanoethyl-2-phenyl-indole |
| 113 | do. | 3-Amino-4-methoxy-toluene | 2-Phenyl-indole |
| 114 | do. | do. | 1-Methyl-2-phenyl-indole |
| 115 | do. | do. | 2-Methyl-indole |
| 116 | do. | do. | 1-β-Cyanoethyl-2-phenyl-indole |
| 117 | do. | do. | 2-Phenyl-indole-5-sulphonic acid |
| 118 | do. | 2-Amino-1,4-dimethoxy-benzene | 2-Phenyl-indole |
| 119 | do. | do. | 1-Methyl-2-phenyl-indole |
| 120 | do. | do. | 2-Methyl-indole |
| 121 | do. | do. | 1-β-Cyanoethyl-2-phenyl-indole |
| 122 | do. | 3-Amino-anisole | 2-Phenyl-indole |
| 123 | do. | do. | 1-Methyl-2-phenyl-indole |
| 124 | do. | do. | 2-Methyl-indole |
| 125 | do. | do. | 1-β-Cyanoethyl-2-phenyl-indole |
| 126 | do. | do. | 2-Phenyl-indole-5-sulphonic acid |
| 127 | do. | do. | 2,5-Dimethyl-indole |
| 128 | do. | 2-Amino-1,4-diethoxy-benzene | 2-Phenyl-indole |
| 129 | do. | do. | 2-Methyl-indole |
| 130 | do. | do. | 2-Phenyl-indole-5-sulphonic acid |
| 131 | do. | do. | 2,5-Dimethyl-indole |
| 132 | do. | do. | 1-Methyl-2-phenyl-indole |
| 133 | do. | do. | 2-Methyl-7-nitro-indole |
| 134 | do. | do. | 2-Phenyl-5-nitro-indole |
| 135 | do. | do. | 2-Methyl-5-chloro-indole |
| 136 | do. | 1-Amino-2,3-dimethyl-benzene | 2-Phenyl-indole |
| 137 | do. | do. | 2-Methyl-indole |
| 138 | do. | do. | 1-Methyl-2-phenyl-indole |
| 139 | do. | α-Naphthyl-amine | 2-Phenyl-indole |
| 140 | do. | do. | 2-Methyl-indole |
| 141 | do. | do. | 1-Methyl-2-phenyl-indole |

-Continued

| Example | Starting Component | Middle Component | End Component |
|---|---|---|---|
| 142 | do. | do. | 2-Phenyl-indole-5-sulphonic acid |
| 143 | do. | do. | 2,5-Dimethyl-indole |
| 144 | do. | do. | 2-Methyl-5-chloro-indole |
| 145 | do. | do. | 2-Phenyl-5-nitro-indole |
| 146 | do. | do. | 1-β-Cyanoethyl-2-phenyl-indole |
| 147 | do. | do. | β-(2-Phenylindolyl-1)-propionic acid amide |
| 148 | do. | 2-Amino-toluene | 1-Methyl-2-phenyl-indole |
| 149 | do. | do. | 2-Phenyl-indole |
| 150 | do. | do. | 1-β-Cyanoethyl-2-phenyl-indole |
| 151 | do. | 3-Amino-ethyl-benzene | 2-Phenyl-indole |
| 152 | do. | do. | 1-Methyl-2-phenyl-indole |
| 153 | do. | do. | 1-β-Cyanoethyl-2-phenyl-indole |
| 154 | do. | do. | 2,5-Dimethyl-indole |
| 155 | do. | 2-Amino-ethyl-benzene | 2-Phenyl-indole |
| 156 | do. | do. | 1-Methyl-2-phenyl-indole |
| 157 | do. | do. | 2-Methyl-indole |
| 158 | do. | do. | 2-Phenyl-indole-5-sulphonic acid |
| 159 | do. | do. | 1-β-Cyanoethyl-2-phenyl-indole |
| 160 | do. | 3-Chloro-aniline | 2-Phenyl-indole |
| 161 | do. | do. | 1-Methyl-2-phenyl-indole |
| 162 | do. | do. | 2-Methyl-indole |
| 163 | do. | do. | 1-β-Cyanoethyl-2-phenyl-indole |
| 164 | do. | 2-Amino-anisole | 1-Methyl-2-phenyl-indole |
| 165 | do. | do. | 2-Phenyl-indole |
| 166 | do. | do. | 2,5-Dimethyl-indole |
| 167 | do. | 3-Amino-ethoxy-benzene | 2-Phenyl-indole |
| 168 | do. | do. | 1-Methyl-2-phenyl-indole |
| 169 | do. | do. | 2-Methyl-indole |
| 170 | do. | do. | 1-β-Cyanoethyl-2-phenyl-indole |
| 171 | do. | 1-Amino-2,5-di-methyl-benzene | 2-Phenyl-indole |
| 172 | do. | do. | 1-Methyl-2-phenyl-indole |
| 173 | do. | do. | 1-β-Cyanoethyl-2-phenyl-indole |
| 174 | do. | do. | 2-Phenyl-indole-5-sulphonic acid |
| 175 | (3-Amino-4-chloro-benzenesulphonyl)-methanesulphonamide | Aniline | 2-Phenyl-indole |
| 176 | do. | do. | 1-β-Cyanoethyl-2-phenyl-indole |
| 177 | do. | do. | 2-Methyl-indole |
| 178 | do. | do. | β-(2-Phenylindolyl-1)-propionic acid amide |
| 179 | (3-Amino-4-chloro-benzenesulphonyl)-benzenesulphonamide | do. | 2,5-Dimethyl-indole |
| 180 | do. | do. | 2-Methyl-5-chloro-indole |
| 181 | do. | do. | 2-Phenyl-indole-5-sulphonic acid |
| 182 | do. | do. | β-(2-Phenylindolyl-1)-propionic acid amide |
| 183 | do. | 3-Amino-toluene | 2-Phenyl-indole |
| 184 | do. | do. | 2-Methyl-indole |
| 185 | do. | do. | 1-Methyl-2-phenyl-indole |
| 186 | do. | do. | 1-β-Cyanoethyl-2-phenyl-indole |
| 187 | do. | do. | 2,5-Dimethyl-indole |
| 188 | do. | do. | 2-Phenyl-5-nitro-indole |
| 189 | do. | do. | 2-Phenyl-indole-5-sulphonic acid |
| 190 | do. | 3-Amino-4-methoxy-toluene | 2-Phenyl-indole |
| 191 | do. | do. | 1-Methyl-2-phenyl-indole |
| 192 | do. | do. | 2-Methyl-indole |
| 193 | do. | do. | 1-β-Cyanoethyl-2-phenyl-indole |
| 194 | do. | do. | β-(2-Phenyl-indolyl-1)-propionic acid amide |
| 195 | do. | do. | 1-Methyl-2-phenyl-6-bromo-indole |
| 196 | do. | do. | 2-Methyl-5-chloro-indole |
| 197 | do. | do. | 2,5-Dimethyl-indole |
| 198 | do. | 3-Amino-anisole | 2-Phenyl-indole |
| 199 | do. | do. | 1-Methyl-2-phenyl-indole |
| 200 | do. | do. | 2-Methyl-indole |
| 201 | do. | do. | 1-β-Cyanoethyl-2-phenyl-indole |
| 202 | do. | do. | 2,5-Dimethyl-indole |
| 203 | do. | 3-Amino-ethyl-benzene | 2-Methyl-indole |
| 204 | do. | do. | 2-Phenyl-indole |
| 205 | do. | do. | 1-Methyl-2-phenyl-indole |
| 206 | do. | do. | 2,5-Dimethyl-indole |
| 207 | do. | do. | 2-Methyl-5-chloro-indole |
| 208 | do. | do. | 2-Methyl-7-chloro-indole |
| 209 | do. | 2-Amino-ethyl-benzene | 1-Methyl-2-phenyl-indole |
| 210 | do. | do. | 2-Phenyl-indole |
| 211 | do. | do. | 2-Methyl-indole |
| 212 | do. | do. | 2-Methyl-indole-5-sulphonic acid |
| 213 | do. | do. | 2,5-Dimethyl-indole |
| 214 | do. | 2-Amino-toluene | 1-Methyl-2-phenyl-indole |
| 215 | do. | do. | 2-Phenyl-indole |
| 216 | do. | do. | 1-β-Cyanoethyl-2-phenyl-indole |
| 217 | do. | do. | 2-Phenyl-indole-5-sulphonic acid |
| 218 | do. | do. | 2,5-Dimethyl-indole |
| 219 | do. | do. | β-(2-Phenylindolyl-1)-propionic acid amide |
| 220 | do. | 2-Amino-anisole | 1-Methyl-2-phenyl-indole |
| 221 | do. | do. | 2-Phenyl-indole |

—Continued

| Example | Starting Component | Middle Component | End Component |
|---|---|---|---|
| 222 | do. | do. | 2-Methyl-indole |
| 223 | do. | do. | 2-Phenyl-indole-5-sulphonic acid |
| 224 | do. | do. | 2,5-Dimethyl-indole |
| 225 | do. | 3-Chloro-aniline | 2-Phenyl-indole |
| 226 | do. | do. | 1-Methyl-2-phenyl-indole |
| 227 | do. | do. | 2-Methyl-indole |
| 228 | do. | do. | 2-Methyl-5-chloro-indole |
| 229 | do. | 3-Bromo-aniline | 2-Phenyl-indole |
| 230 | do. | do. | 2-Methyl-indole |
| 231 | do. | do. | 1-Methyl-2-phenyl-indole |
| 232 | do. | 3-Amino-ethoxy-benzene | 2-Phenyl-indole |
| 233 | do. | do. | 2-Methyl-indole |
| 234 | do. | do. | 1-Methyl-2-phenyl-indole |
| 235 | do. | do. | 1-β-Cyanoethyl-2-phenyl-indole |
| 236 | do. | 1-Amino-2,3-dimethyl-benzene | 2-Phenyl-indole |
| 237 | do. | do. | 2-Methyl-indole |
| 238 | do. | do. | 1-Methyl-2-phenyl-indole |
| 239 | do. | do. | 2-Phenyl-indole-5-sulphonic acid |
| 240 | do. | 1-Amino-2,5-dimethyl-benzene | 2-Methyl-indole |
| 241 | do. | do. | 2-Phenyl-indole |
| 242 | do. | do. | 1-Methyl-2-phenyl-indole |
| 243 | do. | do. | 1-β-Cyanoethyl-2-phenyl-indole |
| 244 | do. | do. | 2,5-Dimethyl-indole |
| 245 | do. | do. | 2-Methyl-5-chloro-indole |
| 246 | do. | 2-Amino-4-methoxy-toluene | 2-Phenyl-indole |
| 247 | do. | do. | 2-Methyl-indole |
| 248 | do. | do. | 1-Methyl-2-phenyl-indole |
| 249 | do. | do. | 1-β-Cyanoethyl-2-phenyl-indole |
| 250 | do. | do. | 2,5-Dimethyl-indole |
| 251 | do. | do. | 2-Phenyl-indole-5-sulphonic acid |
| 252 | do. | 2-Amino-4-ethoxy-toluene | 2-Phenyl-indole |
| 253 | do. | do. | 1-Methyl-2-phenyl-indole |
| 254 | do. | do. | 2-Methyl-indole |
| 255 | do. | do. | 2-Methyl-indole |
| 256 | do. | do. | 2-Phenyl-indole-5-sulphonic acid |
| 257 | do. | 2-Amino-1,4-dimethoxy-benzene | 2-Phenyl-indole |
| 258 | do. | do. | 2-Methyl-indole |
| 259 | do. | do. | 1-Methyl-2-phenyl-indole |
| 260 | do. | do. | 1-β-Cyanoethyl-2-phenyl-indole |
| 261 | do. | do. | 1-Methyl-2-phenyl-indole |
| 262 | do. | do. | 2-Phenyl-indole |
| 263 | do. | do. | 2-Methyl-indole |
| 264 | do. | do. | 2-Methyl-7-chloro-indole |
| 265 | do. | do. | 2,5-Dimethyl-indole |
| 266 | do. | do. | 2-Phenyl-indole-5-sulphonic acid |
| 267 | do. | α-Naphthyl-amine | 2-Phenyl-indole |
| 268 | do. | do. | 1-Methyl-2-phenyl-indole |
| 269 | do. | do. | 1-β-Cyanoethyl-2-phenyl-indole |
| 270 | do. | do. | 2-Methyl-5-chloro-indole |
| 271 | do. | do. | 2-Phenyl-indole-5-sulphonic acid |
| 272 | do. | do. | 2-Methyl-5-chloro-indole |
| 273 | do. | do. | 2,5-Dimethyl-indole |
| 274 | do. | 3-Amino-toluene | 1-Methyl-2-phenyl-indole-5-sulphonic acid |
| 275 | (3-Amino-benzene-sulphonyl)-benzene-sulphonamide | do. | 1-Methyl-2-phenyl-indole-5-sulphonic acid |
| 276 | do. | Aniline | 1-Ethyl-2-phenyl-indole-5-sulphonic acid |

Similar dyestuffs are obtained if the middle components and end components used in Examples 1–276 are employed together with the following (amino-benzenesulphonyl)-sulphonamides as starting components: (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chloro-benzenesulphonyl)-p-toluenesulphonamide, (3-amino-4-chloro-benzenesulphonyl)-butanesulphonamide, (3-amino-4-chloro-benzenesulphonyl)-o-toluenesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)- butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (3-amino-benzenesulphonyl)-dimethylaminosulphonamide, (4-amino-benzenesulphonyl)-diethylaminosulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methoxybenzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide and (4-amino-5-methyl-benzenesulphonyl)-benzenesulphonamide.

We claim:

1. Disazo dyestuff, the free-acid form of which has the formula

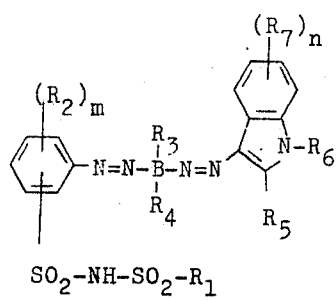

in which

B is 1,4-phenylene or 1,4-naphthylene;
$R_1$ is phenyl; phenyl substituted with $C_1$-$C_4$-alkyl, $C_1$-$C_4$-alkoxy, halogen, nitro or cyano; $C_1$-$C_4$-alkyl; or dialkylamino with 1-6 carbon atoms in the alkyl radical;
$R_2$ is chlorine; bromine; $C_1$-$C_6$-alkoxy; $C_1$-$C_6$-alkoxy substituted by cyano hydroxy or phenyl; $C_1$-$C_4$-alkyl; $C_1$-$C_4$-alkyl substituted by cyano, hydroxy or phenyl;
$R_3$ and $R_4$ are hydrogen; chlorine; bromine; $C_1$-$C_6$-alkoxy; $C_1$-$C_6$-alkoxy substituted by cyano, hydroxy or phenyl; $C_1$-$C_4$-alkyl; or $C_1$-$C_4$-alkyl substituted by cyano, hydroxy or phenyl;
$R_5$ is $C_1$-$C_4$-alkyl; phenyl; or phenyl substituted by $C_1$-$C_4$-alkyl, $C_1$-$C_4$-alkoxy, halogen, cyano or nitro;
$R_6$ is hydrogen, $C_1$-$C_4$-alkyl; or $C_1$-$C_4$-alkyl substituted by cyano, carbonamide or carboxy;
$R_7$ is $C_1$-$C_4$-alkyl; $C_1$-$C_4$-alkyl substituted by cyano, hydroxy or phenyl; $C_1$-$C_6$-alkoxy; $C_1$-$C_6$-alkoxy substituted by cyano, hydroxy or phenyl; halogen; nitro; sulfo; or cyano;
$m$ is a number 0-2; and
$n$ is a number 0-2.

2. Disazo dyestuff of claim 1 in which

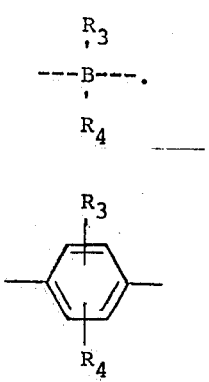

is

3. Disazo dyestuff of claim 1 in which

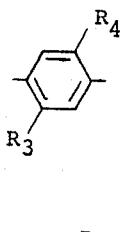

is

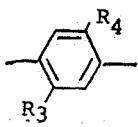

$R_1$ is phenyl; phenyl substituted by $C_1$-$C_4$-alkyl, $C_1$-$C_4$-alkoxy, halogen, cyano or nitro; or $C_1$-$C_4$-alkyl;
$R_2$ is hydrogen, chlorine, bromine, methoxy, ethoxy, methyl or ethyl;
$R_3$ is hydrogen, chlorine, methyl or methoxy;
$R_4$ is hydrogen, methyl or methoxy;
$R_5$ is methyl or phenyl; and
$m$ is 1; and
$n$ is 0.

4. Disazo dyestuff of claim 1 in which

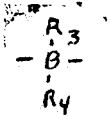

is

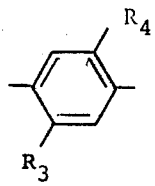

R₁ is phenyl or tolyl;
R₂ is hydrogen, chlorine, bromine, methoxy, ethoxy, methyl or ethyl;
R₃ is hydrogen, chlorine, methyl or methoxy;
R₄ is hydrogen, methyl or methoxy;
R₅ is methyl or phenyl;
$m$ is 1; and
$n$ is 0.

5. Disazo dyestuff of claim 1 in which B is

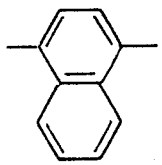

and R₃ and R₄ are H.

6. Disazo dyestuff of claim 1 in which B is

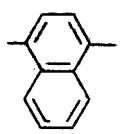

R₁ is phenyl; phenyl substituted by C₁–C₄-alkyl, C₁–C₄-alkoxy, halogen, cyano or nitro; or C₁–C₄-alkyl;
R₂ is hydrogen, chlorine, bromine, methoxy, ethoxy, methyl or ethyl;
R₃ and R₄ are hydrogen;
R₅ is methyl or phenyl;
R₆ is C₁–C₄-alkyl or C₁–C₄-alkyl substituted by cyano, carbonamide or carboxyl;
$m$ is 1; and
$n$ is 0.

7. Dyestuff of claim 1 of the formula

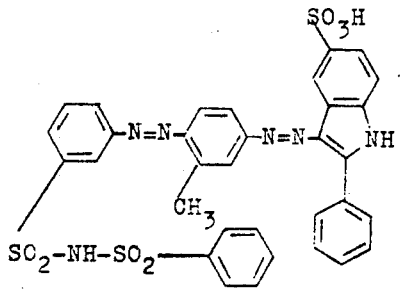

8. Dyestuff of claim 1 of the formula

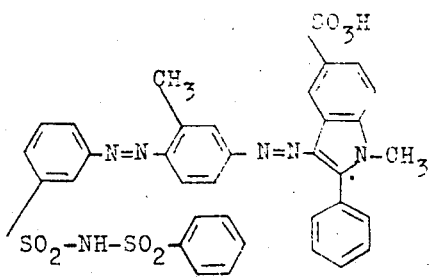

9. Dyestuff of claim 1 of the formula

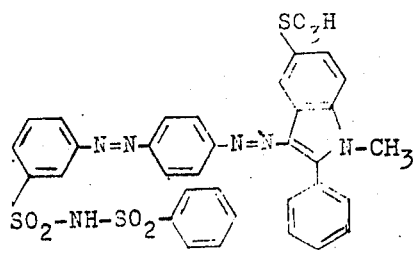

10. Dyestuff of claim 1 of the formula

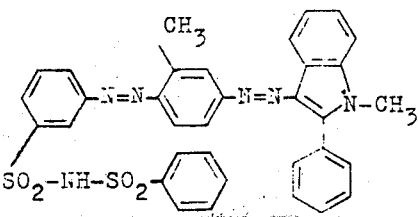

11. Dyestuff of claim 1 of the formula

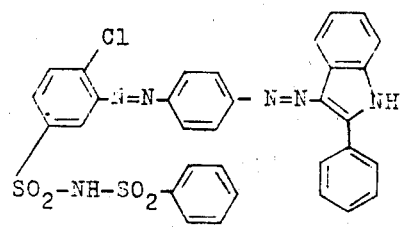

* * * * *